United States Patent [19]
Bailey

[11] Patent Number: 6,073,658
[45] Date of Patent: Jun. 13, 2000

[54] ELBOW FOR CONVEYING PARTICULATE MATTER

[75] Inventor: Robert E. Bailey, Omaha, Ill.

[73] Assignee: General Electric Company, Pittsfield, Mass.

[21] Appl. No.: 09/156,589

[22] Filed: Sep. 18, 1998

[51] Int. Cl.[7] ................................. F16L 9/22; F16L 9/00; F16L 43/00

[52] U.S. Cl. .......................... 138/155; 138/171; 138/177; 285/179

[58] Field of Search .......................... 285/179; 138/155, 138/177, 171, DIG. 11

[56] References Cited

U.S. PATENT DOCUMENTS

| | | | |
|---|---|---|---|
| 2,344,424 | 3/1944 | Singleton | 285/179 |
| 3,450,442 | 6/1969 | Farnworth | 285/179 |
| 4,513,030 | 4/1985 | Milewski | 427/227 |
| 5,884,851 | 3/1999 | Colavito et al. | 239/591 |
| 5,919,493 | 6/1999 | Sheppard et al. | 425/174.2 |

*Primary Examiner*—Andres Kashnikow
*Assistant Examiner*—Davis Hwu

[57] ABSTRACT

An elbow for conveying particulate material comprising a plurality of tubular shaped sections jointed at a junction to form a flow passage having a bend for changing the direction of material being transported wherein the sections consist essentially of silicon carbide which joined at the junction by sintering to form a unitary elbow.

11 Claims, 1 Drawing Sheet

the type utilized to convey resin particles.

ELBOW FOR CONVEYING PARTICULATE MATTER

FIELD OF INVENTION

The present invention relates to an elbow for conduits of the type utilized to convey resin particles.

BACKGROUND OF THE INVENTION

Thermoplastic resins are typically formed by extruding the material through a through a die which shapes the material into long strands. The raw material is placed in a hopper where it is moved into and through a chamber by a screw. The mechanical action of the feeder screw heats and feeds the material through chamber which is typically in the shape of a barrel. The heated and compressed material is then forced through the die at the discharge end of the extruder to form the strands.

The extruded strands are cooled and then chopped into pellets. Typically, the pellet size is on the order of one eighth inch in length by a eighth inch in diameter. The resulting pellets are collected and typically stored. The stored pellets are transported through conduits for packaging in bags or boxes for shipment. Also, the pellets are often transported from the bags or boxes through a transfer system to extrusion equipment for molding into the shape of the final article.

Transfer of solid material is critical to many operations. A weak point in every transfer system is corners where the material changes direction and impinges upon the transfer line. The impingement causes wear at the at the curved areas, i.e. at the elbows. As wear continues an opening will develop and lead to loss of material and shut down of processes dependent on continuous feed of solid materials such as extrusion or injection molding, etc. A catastrophic failure of an elbow can result in even more loss of material and loss time.

There are problems associated with various standard elbow designs and materials. Curved glass for instance is thinned on the outer curve and due to is brittle nature it may be punctured resulting in catastrophic failure. A single chunk of metal or stone can break a whole series of glass elbows. Stainless steel may be used, but it will wear through and may cause contamination of the transferred material with metal. Metal contamination is a problem where good electrical properties are needed such as in plastic electrical connectors. Stainless steel has been treated to give a hardened surface by processes such as nitriding, but this only hardens the outer surface leaving the interior of the elbow to erode.

Elbows made of alumina cannot be readily joined to each other. Typically, such elbows are encased in a large concrete metal sleeve for, joining, protection and support. The resulting constructions are heavy and bulky. They may require support and often need clearance not available in many installations.

U.S. Pat. No. 4,199,010 to McGuth relates to a conduit used to convey particulate matter in which erosion is diminished. A liner placed within the outer wall of the conduit is of ceramic material which is highly resistant to erosion. U.S. Pat. No. 4,684,155 describes a pipe elbow with an abrasion resistant composite inner liner. U.S. Pat. No. 4,478,253 describes an erosion resistant elbow for solids conveyance using a concentric layer. The above elbows are of complex construction and use various wear resistant and supporting layers to form a composite type construction for an elbow.

Hence, it is desirable, to have an elbow for transferring particulate with wear resistant properties that will not fail catastrophically and that is of simple construction.

SUMMARY OF THE INVENTION

In accordance with the present invention, there is provided a elbow for conveying particulate material comprising a plurality of tubular shaped sections which are joined at least at one junction to form a flow passage having a bend for changing the direction of material being transported. The members consist essentially of silicon carbide and are joined at the junction by sintering to form a unitary elbow.

DESCRIPTION OF THE PREFERRED EMBODIMENT

Figure 1:
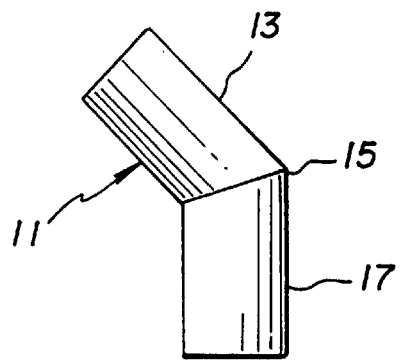
FIG. 1 is a side elevational view of a forty five degree elbow.
Figure 2:
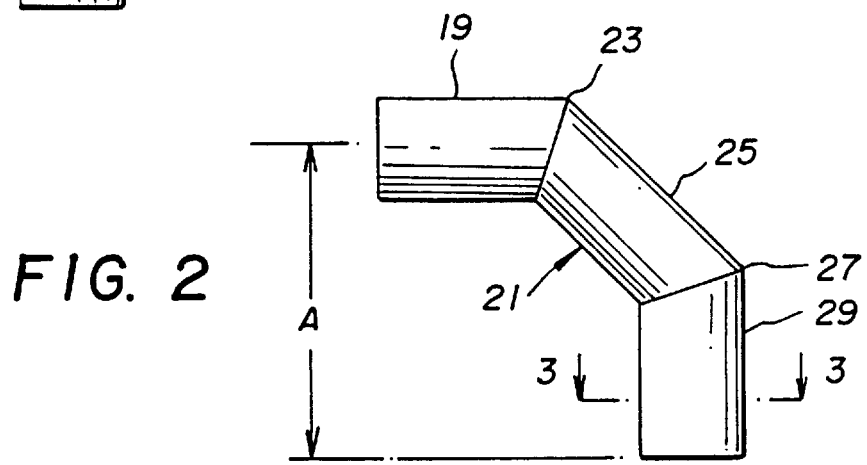
FIG. 2 is a side elevational view of a ninety degree elbow.
Figure 3:
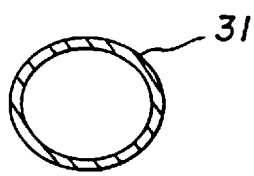
FIG. 3 is a cross section along 3—3 of FIG. 2.

In more detail and in reference to FIG. 1, a tubular shaped elbow 11 has a forty five bend. The elbow 11 includes a straight member or section 13 joined to another straight member 17 at a junction shown at 15. FIG. 2 illustrates an elbow 21 formed from three straight sections, 19, 25 and 29, respectively. Sections 19 and 25 are joined at junction 23 and sections 25 and 29 are joined at junction 27. FIG. 3 illustrated the tubular shaped cross section along 3—3 of FIG. 2. The wall 31 has a tubular or cylindrically shaped configuration in cross section. Both of the elbows 11 and 21 are formed as unitary flow passages consisting essentially of silicon carbide.

The preferred material of construction is reaction bonded silicon carbide. The individual sections referred to above may be conveniently made as "green" un-sintered tubular sections where silicon carbide particulate is held together with an organic binder such as a wax. The tubular "green" sections may be cut with straight saw cuts to form a mitered joint where the two facing cuts form a corner. It is also contemplated that the joint may have a rounded juncture so as form a fillet at the juncture of the tubular sections.

The resulting "green" part may be conveniently held together as by a jig and then sintered at an appropriate temperature to agglomerate the silicon carbide particulate to unify the sections. The resulting sintered unified elbow has increase strength and density as a result of sintering.

The hollow curved elbows may used in conjunction with other straight tubular sections to convey and transfer solid particles, like polymer pellets. The elbow which has a preferred geometry and uniform wall thickness is preferably made of two or more bonded pieces of silicone carbide based materials. Reaction bonded silicone carbide elbows (RBSiC) of the present invention advantageously overcome one or more of the previously discussed problems associated with elbows of the prior art. The silicone carbide can be bonded together giving inherently strong joints, and since silicon carbide is not easily curved, straight sections are preferably used. Single or more preferably double mitered construction are preferred.

Unitary constructions of the present invention have longer life than other elbow materials and are easily installed in space limited situations. The preferred geometry is a double mitered pipe with about a 22 to 90 degree bend or curvature consisting of two or three sections. The most preferred angles for the bend are about 22½, 30, 45 and 90 degrees. Diameter is preferred to be 1.5–6.0 in., wall thickness ⅟₁₆–⅜ in., length from center of bend to end of elbow from 5–18 in. The preferred ratio of the diameter to the wall thickness is about 4 to about 100.

The present invention is effective for use with high density resins, for instance, densities greater than 1 and with resins of the type that are highly abrasive, such as those resins that are glass or mineral filled. However, it is contemplated that the elbows may be utilized in conjunction with any of a variety of materials, such as food stuffs, grain or seed, minerals, recycled materials as well as thermoplastics. Typical thermoplastic materials which may be extruded are high temperature thermoplastics such as acrylonitrile-butadiene-styrene (ABS), polycarbonate, polycarbonate/ABS blend, a copolycarbonate-polyester, acrylic-styrene-acrylonitrile (ASA), acrylonitrile(ethylene-propylene diamine modified)-styrene (AES), polyalkylene terephthalate such as polybutylene terephthalate (PBT) or polyethylene terephthalate (PET) or blends thereof, blends of polyphenylene ether/polyamide (NORYL GTX Registered TM from General Electric Company), blends of polycarbonate/polybutylene terephthalate and impact modifier (XENOY Registered TM resin from General Electric Company), blends of polycarbonate/PBT/PET, etc., or blends thereof with other additives such as fillers, impact modifiers, pigments, stabilizer, reinforcing agents, etc.

Figure 4:
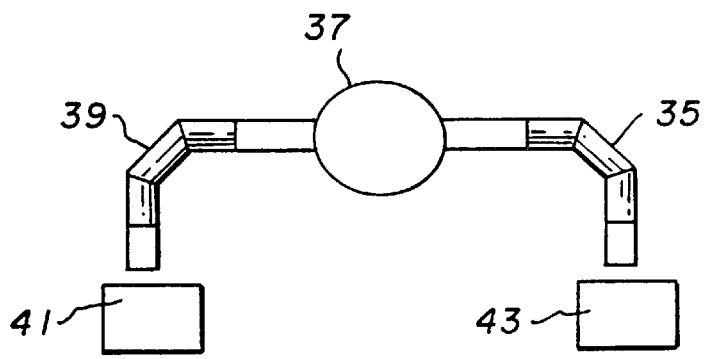
FIG. 4 is a schematic of a conveyance system.

As an example, a mitered elbow of silicon carbide having a three inch diameter with a 6 and ½ inch measurement to the center of the furthest quarter bent was used in a conveyance system transport thermoplastic material. See FIG. 2., measurement A, for the distance to the quarter bend. The specific gravity or density of the material was from about 1.25 to about 2.0. The elbow exhibited an extended life. By way of further illustration, FIG. 4, is a schematic of a particulate transportation system. Reference number 41 is a source of particulate, such as granular resin storage, and reference number 43 illustrates a packing container. Particulate is conveyed from storage 41 to container 43 through the conveyance system which includes elbow 39 and elbow 35 which are interconnected by additional conveying sections such as hollow straight sections. Reference number 37 is a means for entraining the particulate in a fluid stream. Typically, air under a reduced pressure is used to suck the particulate form storage 41 to container 43.

What is claimed is:

1. An elbow for conveying particulate material comprising a plurality of tubular shaped sections being jointed at least at one junction to form a flow passage having a bend for changing the direction of material being conveyed, said members consisting essentially of silicon carbide and joined at said junction by sintering to form a unitary elbow.

2. An elbow for conveying particulate material according to claim 1 wherein said elbow comprises a first straight section joined to another straight section at said junction.

3. An elbow for conveying particulate material according to claim 2 wherein said bend is about 22 to 90 degrees.

4. An elbow for conveying particulate material according to claim 1 wherein said elbow comprises a first straight section joined to a second straight section at a first junction, and third straight section joined to said second straight section at a second junction.

5. An elbow for conveying particulate material according to claim 4 wherein said bend is about 22 to 90 degrees.

6. An elbow for conveying particulate material according to claim 1 wherein said elbow wherein has a wall having a cylindrically shaped configuration in cross section.

7. An elbow for conveying particulate material according to claim 1 wherein said silicon carbide is reaction bonded silicon carbide.

8. An elbow for conveying particulate material according to claim 1 wherein said elbow comprised adjacent sintered tubular sections.

9. An elbow for conveying particulate material according to claim 8 wherein said adjacent sintered tubular sections are mitered.

10. An elbow for conveying particulate material according to claim 8 wherein ratio of the diameter to the wall thickness is about 4 to about 100.

11. An elbow for conveying particulate material according to claim 1 wherein said elbow is operably associated with a means for entraining particulate and at least one hollow conveying section for transporting particulate.

* * * * *